May 13, 1969  O. BIHLMAIER  3,443,498

CAMERA FOR DAYLIGHT AND FLASH EXPOSURE

Filed Feb. 14, 1967

United States Patent Office 3,443,498
Patented May 13, 1969

3,443,498
CAMERA FOR DAYLIGHT AND FLASH EXPOSURE
Oskar Bihlmaier, Braunschweig, Germany, assignor to Voigtlander A.G., Braunschweig, Germany
Filed Feb. 14, 1967, Ser. No. 616,033
Claims priority, application Germany, Feb. 17, 1966, V 18,629
Int. Cl. G03b 19/03, 19/12
U.S. Cl. 95—11    7 Claims

ABSTRACT OF THE DISCLOSURE

A camera having a single slide which coacts with the shutter to provide settings for daylight and flash exposures. The slide also cooperates with the diaphragm to provide aperture settings to be used with flash lamps of different intensities. Indicating means attached to the slide indicates in the viewfinder both the shutter settings and the lamp intensity corresponding to the aperture setting.

BACKGROUND OF THE INVENTION

The invention relates to photographic cameras.

In particular, the invention relates to that type of photographic camera which has a shutter capable of being selectively set, by a suitable mechanism, to provide either an exposure time suitable for daylight exposures or an exposure time suitable for flash exposures. This mechanism which sets the shutter means also is capable of actuating an indicating means which will indicate in the viewfinder of the camera the setting of the shutter means either for daylight or for flash exposures.

With conventional cameras of this type, the mechanism which sets the shutter and which actuates the indicating means is of a complex construction. It consists of a lever system having a plurality of components connected on the one hand to the shutter adjusting structure and on the other hand to the indicating structure which in itself is turnable or shiftable. This complex, multiple-part construction of the above mechanism and the separate arrangement of the indicating means requires a multiplicity of bearings to be provided at various locations. The cost of manufacturing this construction is high and during operation of the structure defects are frequently encountered.

SUMMARY OF THE INVENTION

In accordance with the invention the camera includes a single slide means which coacts with the shutter means for placing the latter either at a setting for daylight exposures or at a setting for flash exposures, and an indicating means is fixed to the slide means for movement therewith and is capable of indicating in the viewfinder the setting which is chosen for the shutter means.

Accordingly, it is a primary object of the present invention to provide a camera of the above general type which has a construction which is far simpler than conventional cameras of this type.

Preferably the slide means and the indicating means which is fixed thereto form a single structural component so that an extremely simple manufacture of the structure of the invention is assured and a minimum number of bearings suffice, so that very little space is required for the structure of the invention and defects are practically never encountered.

Therefore, it is an object of the invention not only to provide an extremely simple construction but also one which is very compact and very reliable in operation.

By making the slide means and the indicating means as a single structural component, the simplicity of the manufacture is enhanced since the slide means and the indicating means fixed thereto can be achieved in a single stamping or pressing operation.

A handle is preferably fixed to the slide means and extends to the exterior of the camera so that it will be accessible for manual shifting of the slide means, and in this way any additional elements for operating the slide means are not required. It is only necessary for the operator to grasp the simple handle which is fixed to and extends from the slide means so that the latter can be directly shifted manually by the operator.

It is furthermore an object of the invention to provide a construction of the above type which is not only capable of setting the shutter means either in a setting for daylight exposures or in a setting for flash exposures, but which in addition is capable of setting a diaphragm of the camera, while the shutter means remains in its setting for flash exposures, to positions providing different apertures which are respectively adapted for use with flash lamps of different intensities. Thus, the slide means of the invention is connected by a pin-and-slot connection to the shutter means for positioning the latter in either of the above settings thereof, and while the shutter means remains in its setting for flash exposures the slide means is capable of moving through a given range of movement with respect to the shutter means and at this time coacts with the diaphragm means for providing the different apertures which respectively correspond to flash-lamps of different intensities. As a result of the pin-and-slot connection between the slide means and the shutter means it is possible on the one hand to provide the desired change in the setting of the shutter means while on the other hand during continued movement of the slide means after the shutter means has been placed in its setting for flash exposures and remains in the latter setting the diaphragm means can be actuated to provide apertures respectively adapted to the different lamp intensities. Thus, it is possible to achieve with the simple structure of the invention not only a camera capable of providing shutter settings for daylight and flash exposures, but also the same structure is used for providing diaphragm settings for different lamp intensities, respectively.

It is, furthermore, an object of the present invention to provide an indicating means which will indicate in the viewfinder not only the particular setting of the shutter means but also the lamp intensity for which the diaphragm is set. There are arranged in the viewfinder symbols for daylight and flash exposures as well as for different lamp intensities to be used during the flash exposures, and the indicating means which is fixed to the slide means for movement therewith is opaque except for a single opening which becomes aligned with only one of these symbols, this one symbol being that which corresponds to the setting of the shutter and the aperture of the diaphragm, while the remaining symbols are covered by the opaque extension of the slide means which forms the indicating means. Of course, instead of providing a stationary symbol in the viewfinder and a single opening in the indicating means which moves with the slide means, it is possible to reverse this arrangement and provide the opening in the viewfinder while the indicating means which moves with the slide means carries the various symbols which are respectively aligned in this case with the opening in the viewfinder.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF PREFERRED EMBODIMENTS

Figure 1:
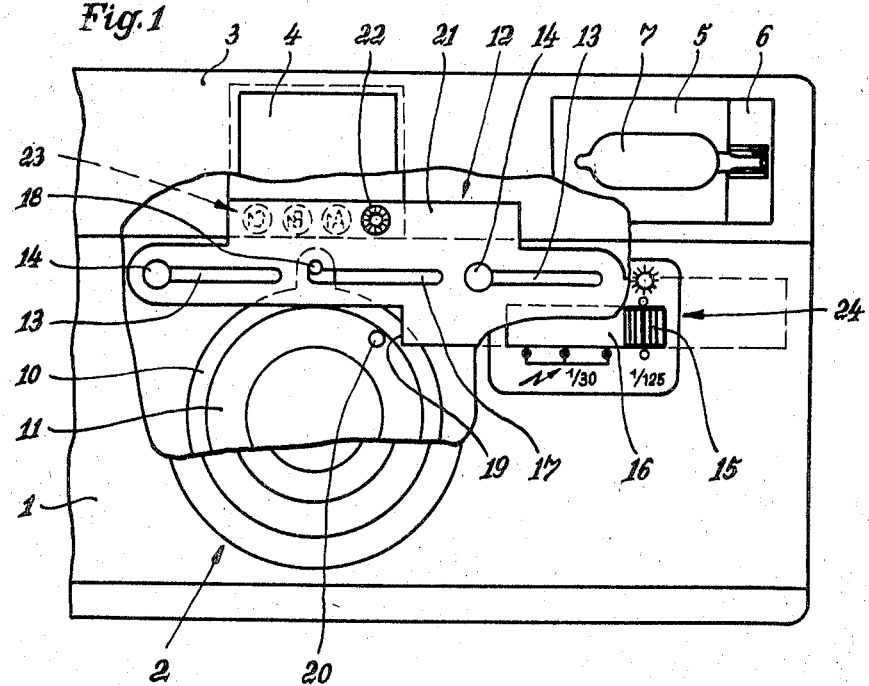
FIG. 1 is a fragmentary schematic front view showing parts of a camera situated in different planes and illustrating the structure of the invention when set to provide daylight exposures.

The camera which is shown in FIG. 1 includes a housing 1 carrying an objective holder 2 and a hollow cap 3. Within this cap is located a see-through viewfinder 4 of conventional construction. In addition, the cap carries a reflector 5 which is directed forwardly and which carries a socket 6 for receiving the base of a flash-lamp 7.

Figure 2:
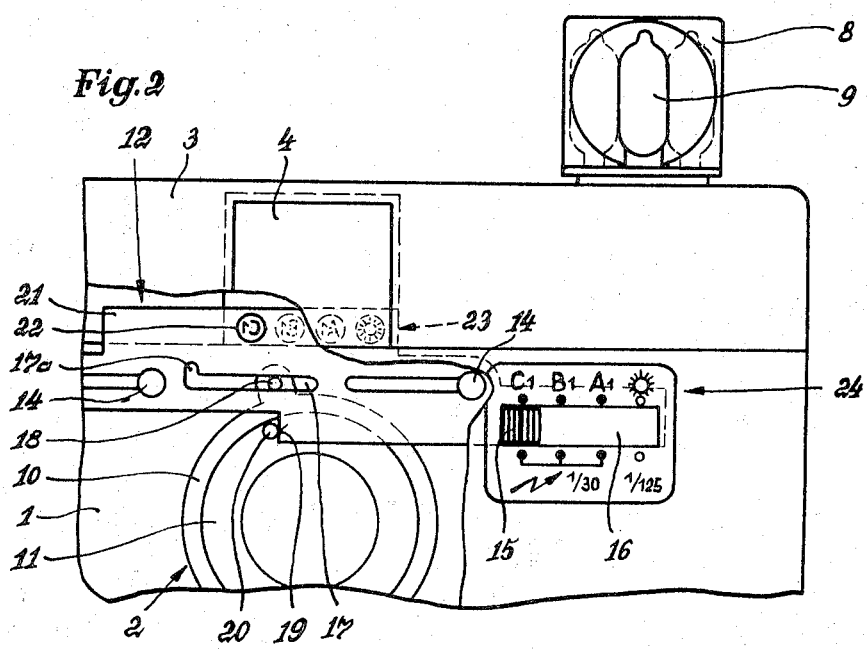
FIG. 2 is a fragmentary front elevation corresponding to that of FIG. 1 but showing the structure set for providing flash exposures.

The camera of FIG. 2 corresponds to that of FIG. 1 except for the flash structure. Identical parts are designated by the same reference characters. The flash structure used with the camera of FIG. 2 includes a flashcube 8 having four lamps, this flashcube being turnably carried by the cap 3 and being automatically turned by a mechanism of the camera so that at any given time an unignited, fresh flash lamp 9 is situated in the front operating position when the camera is ready to make an exposure.

The shutter means of the illustrated camera includes an exposure-time setting ring 10 which is capable of being selectively turned to provide an exposure time suitable for daylight exposures, such as an exposure time of $\frac{1}{125}$ sec., or the ring 10 of the shutter means may be set to a position where the shutter means will provide an exposure time suitable for flash exposures, such as, for example, an exposure time of $\frac{1}{30}$ sec. Moreover, the camera includes a diaphragm means having a diaphragm adjusting ring 11 capable of being turned to provide different apertures in a well known manner.

In order to adjust the camera a one-piece slide means 12 is provided, this slide means being in the form of an elongated horizontally extending slide member formed with elongated guide slots 13 which receive stationary pins 14 which are fixedly mounted in the camera housing and which coact with the slots 13 to guide the slide 12 for horizontal movement to the left and right, as viewed in the drawings. A handle 15 is fixedly carried by the slide 12 and extends through a horizontal slot 16 formed in the front wall of the camera and extending parallel to the guide slots 13, so that the handle 15 is accessible at the exterior of the camera.

The slide means coacts directly with the shutter means to provide the different settings thereof and for this purpose a pin-and-slot connection is provided between the slide 12 and the shutter-setting ring 10. Thus, the slide 12 is formed with an elongated slot 17 which through the greatest part of its length extends along a straight line parallel to the guide slots 13 while at its left end the slot 17 is provided with an angularly extending portion 17a, this portion extending upwardly from the horizontal portion of the slot 17. The pin of the pin-and-slot connection includes a pin 18 which is fixed to the shutter-setting ring 10 and which is received in the slot 17.

In addition, the slide means 12 coacts with the diaphragm means 11 for setting the latter to provide different apertures, and for this purpose the slide means 12 includes a projection 19 in the form of a step or shoulder of the single plate which forms the slide 12, the ring 11 carrying a pin or projection 20 situated in the path of movement of the projection 19.

The indicating means for indicating the setting of the shutter means and the lamp intensity corresponding to the aperture of the diaphragm means includes an opaque extension 21 of the slide 12, so that the indicating means is fixed to the latter for movement therewith, this extension 21 being formed with a single opening 22. The extension 21 extends into the path of light rays extending through the viewfinder 4, so that the indicating means 21 projects into the viewfinder.

Within the viewfinder there is situated in the region of the extension 21, to be overlapped thereby, a row of symbols 23 carried by a transparent plate so that the symbols will be visible in response to light passing through the transparent plate. These symbols 23 are, as viewed from the right toward the left in the drawings, a daylight symbol and three different lamp intensity symbols. The front wall of the camera carries at its exterior a plate formed with a slot which is aligned with and of the same size as the slot 16 so that this plate surrounds the slot 16, and this plate carries a row of symbols 24 with respect to which the handle 15 is adapted to be aligned, so that the handle 15 acts as an index cooperating with the row of symbols on the outer plate. The row of symbols 24 carried by the plate at the front wall of the camera are arranged as indicated in the drawings so that there is an upper row of symbols corresponding to those in the viewfinder and a lower row of symbols indicating exposure times as well as indicating flash operation. Thus, these symbols 24 indicate daylight and flash operation.

The above-described structure operates in the following manner:

FIG. 1 shows the structure in a position for making daylight exposures. This fact is apparent from the position of the handle 15. Above the handle 15 there is shown in FIG. 1 a symbolic representation of the sun, indicating that the camera is set for daylight operation, while below the handle 15 is the indication that the exposure time is $\frac{1}{125}$ sec. In this position the pin 18 is situated in the lateral extension 17a of the slot 17. The projection 19 does not engage the pin 20 at this time so that any desired aperture can be set into the camera. In the viewfinder the position of the camera for a daylight exposure is indicated by reason of the fact that at this time the opening 22 of the indicating means is in alignment with the daylight symbol in the viewfinder, and since the extension 21 is opaque the operator will see only the daylight symbol in the viewfinder.

In order to set the camera to make flash exposures, the slide 12 is shifted to the left by means of the handle 15, so that, for example, the slide is placed in the position shown in FIG. 2. In this way the handle 15 can be placed in a position where it is aligned with that one of the symbols which corresponds to the intensity of the lamp 7 or the lamp 9, these different intensities being indicated by the symbols $A_1$, $B_1$, $C_1$. During this shifting of the slide from the position of FIG. 1 to the position of FIG. 2 the shutter means is initially set by turning of the ring 10, as a result of displacement of the pin 18 to the lower horizontal part of the slot 17, to a location where the counterclockwise turning of the ring of the shutter means, as viewed in the drawings, will set the shutter to provide an exposure time suitable for flash exposures. In the illustrated example this is an exposure time of $\frac{1}{30}$ sec., which is apparent at the exterior indicating symbols 24. The turning of the shutter setting ring is terminated by the time that the handle 15 has been moved to a distance sufficient to situate the opening 22 in alignment with the first symbol $A_1$. During the continued shifting of the slide the shutter remains in the setting for $\frac{1}{30}$ sec., because the horizontally extending part of the slot 17 simply moves with respect to the pin 18 without producing further turning of the shutter-setting ring. Thus, when the slide is shifted, as shown in FIG. 2, to a position providing alignment between the opening 22 and a lamp-intensity symbol beyond the symbol $A_1$ in the viewfinder, the setting of the shutter does not change. However, during this further movement of the slide means of the invention the projection 19 thereof by its engagement with the pin or projection 20 of the diaphragm means changes the aperture of the diaphragm so that the diaphragm will provide an aperture which is adapted to the selected lamp intensity. Thus, the indicating means 21 will in the illustrated example situate the opening 22 in alignment with the symbol $C_1$, while the diaphragm means has been automatically set to provide an aperture adapted to this particular lamp intensity.

As is apparent from the above description the structure of the invention is particularly suited for relatively simple cameras having only two different exposure times, and the uncomplicated construction of the invention for providing either daylight or flash exposures matches the simplicity of the camera construction.

All of the above features shown in the drawings and described above, as well as their constructive details, can be combined in any desired combination.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings will be interpreted as illustrative and not in a limiting sense.

What is claimed is:

1. In a camera, a viewfinder, shutter means having a setting for daylight exposures and a setting for flash exposures, a single slide means coacting directly with said shutter means for placing the latter in one or the other of said settings thereof, and indicating means fixed to said slide means for movement therewith and indicating in the viewfinder that one of said settings of said shutter means which is provided by said slide means.

2. The combination of claim 1 and wherein said slide means and said indicating means together form a single structural component.

3. The combination of claim 1 and wherein a handle is fixed to said slide means and is accessible at the exterior of the camera for manual movement of said slide means.

4. The combination of claim 1 and wherein a diaphragm means provides different apertures, said slide means having a pin-and-slot connection with said shutter means for displacing the latter between said settings during only part of the movement of said slide means with respect to shutter means, said slide means having a range of movement with respect to said shutter means during which said shutter means remains in said setting for flash exposures while said slide means coacts with said diaphragm means for setting the latter to provide different apertures adapted to be used with flash lamps of different intensities, respectively.

5. The combination of claim 4 and wherein said pin-and-slot means includes a straight slot portion moving with respect to a pin to provide no displacement of said shutter means from said setting thereof for flash exposures during said range of movement of said slide means, and said slide means having a projection while said diaphragm means also has a projection engaged by said projection of said slide means during said range of movement thereof for providing different apertures respectively adapted for use with said lamps of different intensities.

6. The combination of claim 1 and wherein a stationary member in said viewfinder carries transparent symbols indicative of said settings, said indicating means including an opaque extension of said slide means overlapping said symbols and formed with an opening respectively having positions aligned with said symbols when said slide means respectively has positions providing said settings, the symbol with which said opening is aligned corresponding to the setting of said shutter means provided by said slide means while said opaque extension prevents viewing of any but that one symbol which is aligned with said opening, so that said indicating means indicates in the viewfinder the setting which is provided by said slide means.

7. The combination of claim 5 and wherein said viewfinder carries a plurality of symbols respectively indicative of said settings of said shutter means and said lamp intensities, and said indicating means including an opaque extension of said slide means formed with an opening which moves along a path along which said symbols are arranged during movement of said slide means to provide said settings of said shutter means and said apertures of said diaphragm means, and said opening of said extension being aligned at any given position of said slide means only with that one of said symbols which corresponds to the setting of said shutter means and the aperture of said diaphragm means while the remaining symbols are covered by said opaque extension so that they are not visible.

References Cited

UNITED STATES PATENTS

| 3,326,104 | 6/1967 | Mische | 95—11 |
| 3,374,718 | 3/1968 | Hochreiter | 95—11.5 X |
| 3,393,623 | 7/1968 | Gutmann et al. | 95—44 |

NORTON ANSHER, *Primary Examiner.*

CHARLES E. SMITH, *Assistant Examiner.*

U.S. Cl. X.R.

95—45